Patented Nov. 22, 1938

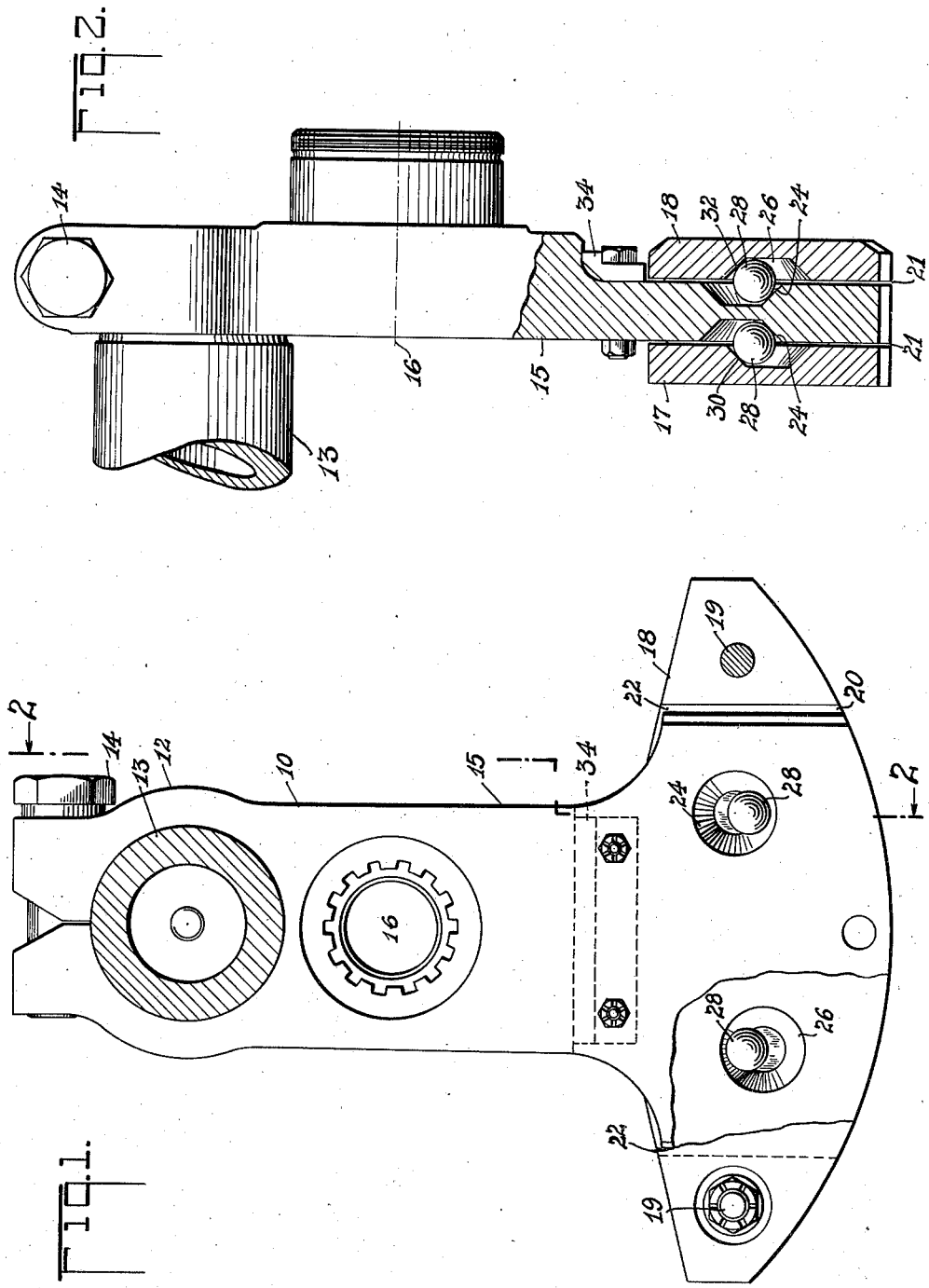

2,137,418

UNITED STATES PATENT OFFICE 2,137,418

DYNAMIC DAMPER

Charles M. Shay, Hawthorne, N. J., assignor to Wright Aeronautical Corporation, a corporation of New York Application January 9, 1937, Serial No. 119,730

14 Claims. (Cl. 74—604)

This invention relates to torsional vibration dampers for engines, and is particularly concerned with a means of suspending an oscillating counterweight to a crankshaft member to permit of free oscillation of the counterweight in the plane of rotation of the shaft, and to provide means whereby the counterweight will align itself with the direction of resultant centrifugal force.

The invention is essentially concerned with that type of torsional vibration equalizer shown in a copending patent application in the name of Chilton No. 7,475. Said application teaches the utilization of a flexibly supported counterweight on a crank extension for an engine crankshaft, the counterweight serving a dual function in that it is adapted to balance certain engine components which are otherwise unbalanced, the counterweight being free to oscillate slightly in the plane of rotation to provide a dynamic balancing organization for torsional impulses imposed upon the crankshaft. The method of suspension outlined in said prior application consisted of arcuate tracks in the crank extension and in the counterweight, engaged by rollers of smaller diameter than the tracks, so that the counterweight is free to oscillate as a simple pendulum with a pendulum length equal to the difference in diameter between the tracks and the rollers. The theory of the dynamic torsional equilization is fully expounded in said prior application, and suffice it to say, insofar as this invention is concerned, that the mode of operation is similar.

An object of this invention is to provide a novel method of suspending an oscillating counterweight upon a crank extension, whereby spherical elements, such as hardened steel balls, provide a movable means of suspension between the elements.

Further objects will be apparent from a reading of the subjoined specification and claims, and from an examination of the drawing, in which like numerals indicate similar parts, and in which:

Fig. 1 is an end view of a crank, crank extension and counterweight, portions of the counterweight and extension being broken away to show the suspension system, and Fig. 2 is a section on the line 2—2 of Fig. 1.

A crank 10 is shown as being provided with a clamp end 12 adapted to embrace a crankpin 13, the crankpin being clamped by means of a bolt 14. The crank is extended as at 15 beyond the crankshaft center 16 and is laterally extended at its lower end for embracement by two substantially similar halves 17 and 18 of a counterweight mass. The halves are bolted together at their ends by means of bolts 19, the halves being formed with recessed portions 20 to provide a running clearance 21 in an axial direction and to provide a circumferential clearance 22 to permit of oscillation of the counterweight halves with respect to the extension 15 in the plane of rotation. The extension 15 is provided with opposed frusto-conical recesses 24 arranged in opposed pairs, four of such recesses being provided in the present embodiment. Similar frusto-conical recesses 26 are formed in the two counterweight halves 17 and 18, one recess being located substantially opposite each recess 24. Consequently, an enlarged recess is provided by the opposition of each of recesses 24 and 26, within which a hardened steel ball 28 is placed. All of the several balls are of equal size and are of such diameter as to provide a slight axial clearance between the ball and the bottoms of the associated recesses 24 and 26. The normal contact between the balls and the associated track surfaces of the recesses takes place on a diameter of each ball which is inclined with respect to the shaft axis and to the circumferential plane. Accordingly, the counterweight is stabilized in the circumferential plane by the spaced contacts 30 and 32, as shown in Fig. 2. The arcuity of the respective recesses at the points of contact of the balls with the surfaces of said recesses is so organized that, with the arcuity of the balls, the pendulum length of the connecting system is of the desired magnitude to produce a normal frequency of swing in the counterweight equivalent to the frequency of the exciting torsional impulses imposed upon the crankshaft.

Essentially, the several recesses 24 and 26 provide opposed arcuate tracks upon which the balls 28 are in pure rolling contact, said arcuate tracks being inclined with respect to the crankshaft axis. It is anticipated that the counterweight halves and the crankshaft extension be hardened, so that the arcuate tracks formed thereon will be of such character as to resist wear as the balls 28 roll thereon. The balls themselves provide the connecting means between the crankshaft extension and the counterweight, to resist radial displacement of the counterweight due to centrifugal force, but they permit free action of the counterweight relative to the extension in the plane of rotation.

To confine the movement of the counterweight within normal reasonable limits, a bar 34 may be bolted to the extension 15 against which the counterweight half 18 may abut, should the magnitude of counterweight oscillation be sufficiently great, as under engine starting conditions. Ordinarily, the magnitude of oscillation is of small order so that such abutment does not occur during normal engine running.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a pendulum type torsion equalizer for an engine crank-shaft, a crank extension having spaced pairs of substantially frusto-conical recesses, the recesses of each pair being formed opposite one another on the faces of said extension, a counterweight embracing said extension and having frusto-conical recesses, one substantially opposite each said extension recess, and spherical elements respectively contacting the opposite conical surfaces of respective recesses in said counterweight and extension.

2. In a pendulum type torsion equalizer for an engine crank-shaft, a counterweight, a crank extension embraced by said counterweight, said extension and counterweight having formed therein sets of opposite arcuate tracks inclined relative to the shaft axis, and a ball element in rolling contact between the tracks of each set.

3. In a pendulum type torsion equalizer for an engine crank-shaft, a crank extension member and a counterweight member, each said member having a plurality of arcuate tracks, each track being inclined relative to the shaft axis and facing toward a corresponding track on the other member, and a spherical element engaged between each set of opposite tracks on the members for freely supporting said counterweight relative to said extension.

4. The combination with a crankshaft having an extension member including inclined arcuate tracks, of a counterweight including inclined arcuate tracks, and spherical rollable elements rollable upon respective tracks.

5. The combination with a crankshaft member and a counterweight member having opposed, inclined, arcuate tracks, of rollable members having spherical profile engaging respective tracks.

6. The combination of a crankshaft member and a counterweight member each having frusto-conical pockets comprising opposed arcuate tracks, of spherical rollable elements engaging said tracks.

7. The combination of a crankshaft extension member and a counterweight member, of a pair of oppositely inclined sets of arcuate tracks formed on opposite sides of said members, and rollable elements having spherical track engaging faces engaging respective tracks.

8. The combination with a crankshaft member and a counterweight member having opposed tracks, of a rollable element bearing on respective tracks for supporting said members relative to each other, said rollable element being curved in the plane of shaft rotation and in planes parallel to the shaft axis.

9. The combination with a crankshaft member and a counterweight member having opposed arcuate tracks, of a rollable element bearing on respective tracks and supporting said members relative to each other, said rollable element having a spherical track contacting profile.

10. The combination with a shaft member and a counterweight member each having opposed tracks, of a rollable element rollably engaging respective tracks for support of said counterweight against the action of centrifugal force, said tracks and rollable element being relatively convex in curvature in planes normal to the shaft axis and in planes parallel to the shaft axis.

11. A shaft member having an inwardly facing track, a counterweight member having an outwardly facing track, and an element interposed between said tracks for supporting the counterweight member on said shaft against the action of centrifugal force, said element having rolling engagement with said tracks in planes normal to the shaft axis and in planes parallel to the shaft axis.

12. In combination, a shaft member having tracks, a counterweight having opposed tracks, and elements rollably engaging respective sets of tracks for relative movement of said members and elements in a plane normal to the shaft axis, said elements and at least one of each set of tracks being relatively convex in planes parallel to the shaft axis for allowing relative rocking of said members in a plane parallel to the shaft axis.

13. The combination, with a crankshaft member and a counterweight member having freedom circumferentially in a direction parallel to the shaft axis, and said members having opposed arcuate tracks, of rollable elements bearing on respective tracks, said rollable elements having spherical track-contacting profiles.

14. The combination, with a crankshaft member and a counterweight member having freedom circumferentially in a direction parallel to the shaft axis, and said members having opposed arcuate tracks, of rollable elements bearing on respective tracks, said rollable elements having curved profile in a plane substantially parallel to the axis of the crankshaft member, and having curved profile in a plane substantially normal to the axis of the chankshaft member.

CHARLES M. SHAY.